United States Patent [19]

Kruger et al.

[11] Patent Number: 4,889,195

[45] Date of Patent: Dec. 26, 1989

[54] DRILL BIT DIRECT DRIVE FOR DEEP WELL DRILLING TOOLS

[76] Inventors: Volker Kruger, Sassengarten 8, D-3100, Celle; Heinrich Daenicke, Sandlinger Kirchweg 10, D-3101, Wienhausen, both of Fed. Rep. of Germany

[21] Appl. No.: 172,589

[22] Filed: Mar. 24, 1988

[30] Foreign Application Priority Data

Mar. 25, 1987 [DE] Fed. Rep. of Germany ....... 3709838

[51] Int. Cl.⁴ .............................................. E21B 4/02
[52] U.S. Cl. .................................... 175/107; 175/320; 384/95
[58] Field of Search .................... 175/320, 92, 93, 101, 175/106, 107; 384/93, 95

[56] References Cited

U.S. PATENT DOCUMENTS

| | | | |
|---|---|---|---|
| 3,858,668 | 1/1975 | Bell | 175/107 |
| 4,386,666 | 6/1983 | Crase et al. | 175/107 |
| 4,410,054 | 10/1983 | Nagel et al. | 384/95 |
| 4,629,013 | 12/1986 | Kruger et al. | 175/320 |

Primary Examiner—Jerome W. Massie, IV
Assistant Examiner—TerryLee Melius
Attorney, Agent, or Firm—Arnold, White & Durkee

[57] ABSTRACT

A drill bit direct drive for deep well drilling tools includes a tubular casing, a rotary machine provided inside the casing and driven by oil well fluid flowing through it, a radially mounted shaft connected to a rotary drill bit and at least one friction bearing exposed to the oil well fluid for axial bearing of the shaft and having at least one trace ring supported on the shaft plus at least one bearing ring supported on the housing and working together with one trace ring. This bearing ring has a number of bearing segments distributed regularly around its periphery including a bearing body supported with respect to the bearing ring so it can be shifted axially and tilted to a limited extent against the action of a spring force. The bearing body is designed as a circular disk that has a holding pin on its lower side that engages an axial hole in the bearing ring with some tolerance and is supported with respect to the bearing ring by a spring assembly that has at least two disk springs stacked in the same direction.

7 Claims, 2 Drawing Sheets

DRILL BIT DIRECT DRIVE FOR DEEP WELL DRILLING TOOLS

BACKGROUND OF THE INVENTION

This invention concerns a drill bit direct drive for deep well drilling tools.

With a known drill bit direct drive of this type (German Patent No. 3,513,124), the bearing segments are each arranged at the free end of a bending bar that is a shaped component of the bearing ring. Such an axial bearing design is especially low in wear, because it permits formation of a gap that converges relative to the bearing segments in the direction of rotation of the bearing ring and the oil well fluid can form a lubricant film in this gap. The bending bars are also suitable for absorbing very high loads, but they have a very small spring range in operation and therefore impart only a very small equalization of tolerance to the axial bearing per trace ring/bearing ring pair. In cases when a relatively great equalization of tolerance by the axial bearing is necessary, the axial bearing must have a number of trace ring/bearing ring pairs which is in turn associated with high costs and also a substantial structure size of the axial bearing.

This invention is based on the problem of creating a drill bit direct drive with an axial bearing that is suitable especially for low axial loads, is inexpensive and yields a greater equalization of tolerance per trace ring/bearing ring pair.

The tiltability achieved with the axial bearing of the drill bit direct drive according to his invention makes it possible to form a lubricant gap in operation and thus permits operation under favorable wear conditions. The spring assembly supporting the bearing body permits axial shifting of the bearing body with a far greater spring range, so the bearing yields a great equalization of tolerance. The disk springs made of special spring steel are especially insensitive to temperatures, they resist wear despite the abrasive effect of the drilling fluid and they present especially favorable static and dynamic friction values. The load bearing capacity of a trace ring/bearing ring pair is lower in comparison with the known bearing with bending bar support of the bearing segment but can be adapted more easily to the given load requirements, because the spring characteristics can be varied more easily and inexpensively by changing the spring assembly than those of a bending bar shaped in the bearing ring.

BRIEF DESCRIPTION OF THE DRAWINGS

Additional details and advantages can be derived from the following description and a figure where two practical examples of the object of this invention are illustrated in detail. The Figures show the following.

DETAILED DESCRIPTION OF A PREFERRED EMBODIMENT

Figure 1:
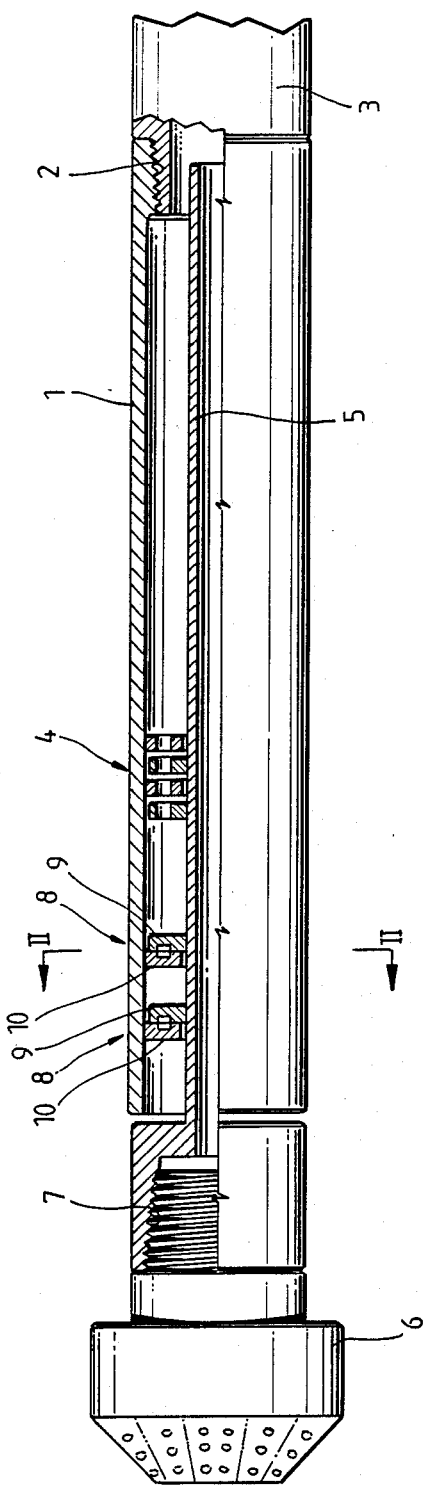
FIG. 1 shows a schematic diagram of a cutaway longitudinal section through a drill bit direct drive according to this invention.
Figure 2:
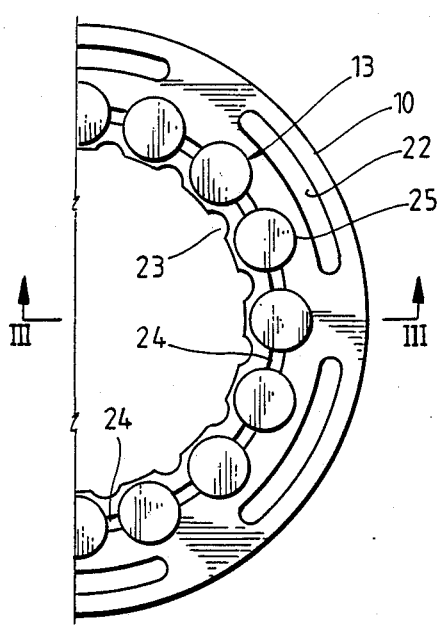
FIG. 2 shows a half sectional view according to line II—II in FIG. 1.

The drill bit direct drive illustrated in FIG. 1 includes a tubular casing 1 that can be connected by a thread 2 to casing pipe 3. Inside casing 1, there is a rotary machine in the form of a turbine that can be driven by oil well fluid flowing through it and its shaft 5 passes axially out of casing 1 and has a thread 7 for joining it to a rotary drill bit 6. In the example shown in FIG. 1, an axial bearing with two trace ring/bearing ring pairs 8 is provided to receive the axial forces acting on shaft 5, and in the version shown in FIG. 3, there are three trace ring/bearing ring pairs 8 which are preferably identical to each other and each has one trace ring 9 and one bearing ring 10. The number of trace ring/bearing ring pairs 8 depends on the given load conditions under which the deep well drilling tool must operate.

Figure 3:
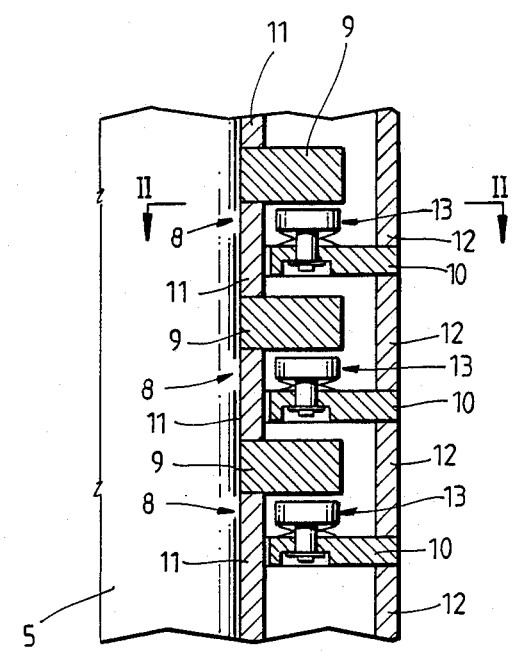
FIG. 3 shows a sectional view along line III—III in FIG. 2.
Figure 4:
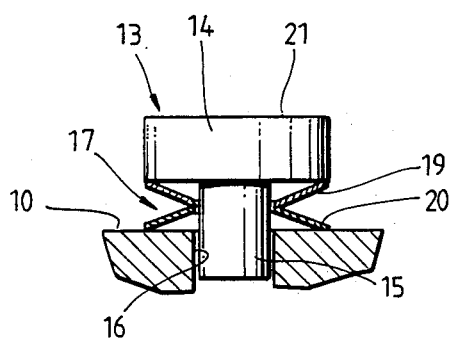
FIG. 4 shows a cutaway detail of a side view of a bearing body with a spring assembly support by a pair of disk springs.
Figure 5:
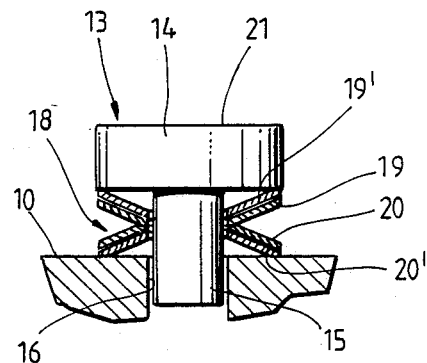
FIG. 5 shows a view like FIG. 4 to illustrate a spring assembly support with four disk springs.

As shown in FIG. 3, the trace rings 9 are each supported on shaft 5 with the assistance of spacers 11 while the bearing rings 10 are each supported on casing 1, likewise with the help of spacers 12.

Bearing rings 10 have several bearing segments 13 distributed regularly around the periphery, each including a bearing body 14 that has limited tilting and axial movement against the action of a spring force in comparison with bearing body 14 supported on the bearing ring. Bearing body 14 is designed as a circular plate that has a holding pin 15 on its lower side. These holding pins 15 which are designed preferably with a polygonal cross section to prevent sedimentation phenomena mesh with axial boreholes 16 in bearing ring 10 with enough tolerance remaining between the holding pin 15 and the preferably circular axial boreholes 16 that the bearing bodies 14 can be tilted as a whole to a limited extent.

Bearing bodies 14 are supported with respect to bearing ring 10 by a spring assembly 17 or 18, where spring assembly 17 has two disk springs 19, 20 stacked in opposite directions and spring assembly 18 includes four disk springs 19, 19', 20, 20', where disk springs 19, 19' on the one hand and 20, 20' on the other hand are paired up and in contact in the same direction and then are arranged in pairs facing in opposite directions.

Bearing bodies 14 may be designed as steel bodies having a bearing layer 21 of a hard wear resistant bearing material, e.g., a sintered metal powder ceramic material or preferably a polycrystalline diamond material on the top side. Trace rings 9 in turn consist of a bearing body, preferably made of steel, with a support made of bearing material of the above-mentioned type.

Bearing ring 10 has slits 22 for the oil well fluid to pass through radially outside bearing body 14 and is also provided with recesses 23 that improve the passage of oil well fluid in the area of the internal edge. At the same time slits 22 to 23 reduce the weight of the bearing rings.

The axial bores 16 in bearing ring 10 are interconnected at the upper ends by sections 24 of a ring groove cut in the top side of bearing ring 10 (and interrupted in the area of the axial bores 16) where the average diameter corresponds to the diameter of the midpoint circle 25 of the axial bores 16. This groove also serves to prevent deposits in the area of bearing body 14, especially in the axial bores 16, which might interfere with the spring action shifting movements of bearing bodies 14.

What is claimed is:

1. A drill bit direct drive for deep well drilling tools, comprising:
   a rotary drill bit;
   a tubular casing;
   a rotary machine positioned within said tubular casing and being adapted to be driven by oil well fluid flowing therethrough;
   a shaft being axially mounted within said tubular casing and connected between said rotary machine and said rotary bit whereby rotation of said rotary machine is transferred through said shaft to said rotary bit; and
   a bearing assembly rotatably interconnecting said shaft and said tubular casing whereby said shaft is free to rotate relative to said tubular casing, said bearing assembly comprising,
      a trace ring having a preselected outer diameter, said trace ring being supported on the outer surface of said shaft and extending a preselected radial distance therefrom in a direction generally toward the inner surface of said tubular casing;
      a bearing ring having a plurality of boreholes extending axially therein, said bearing ring having an inner diameter less than the trace ring outer diameter and being supported on the inner surface of said tubular casing and extending a preselected radial distance from the tubular casing inner surface in a direction generally toward said shaft, said bearing and trace rings being positioned a preselected axial distance apart;
      a plurality of bearing segments being disposed axially intermediate said trace and bearing rings, each of said bearing segments having a trace ring engaging surface, a bearing ring engaging surface, and a holding pin extending from said bearing ring engaging surface into one of said bearing ring axial boreholes, each of said holding pins having a diameter substantially less than the corresponding bearing ring axial borehole diameter whereby the bearing segments are capable of limited tilting relative to said bearing ring, and providing a space between the trace ring and trace ring engaging surface having a gradually reducing axial dimension in the direction of rotation of the shaft and trace ring relative to the tubular casing and bearing ring; and
      a plurality of disk springs having a bore extending therethrough and being positioned about the holding pin intermediate the bearing ring and the bearing ring engaging surface of each bearing segment, said disk springs arrangement to urge said bearing segments in a direction generally toward said trace ring.

2. The drill bit direct drive of claim 1, wherein each of said holding pins has a polygonal cross sectional configuration.

3. The drill bit drive of claim 2, wherein each of said bearing ring axial boreholes has a generally circular cross sectional configuration.

4. The drill bit direct drive of claim 1, wherein said bearing ring axial boreholes are arranged in said bearing ring with the center of each of said boreholes coinciding with a circle coaxial with said bearing ring and having a diameter intermediate the bearing ring inner and outer diameters.

5. The drill bit direct drive of claim 4, wherein said bearing ring includes a ring groove extending into a surface of said bearing ring adjacent said bearing segments and having an inner diameter corresponding to a circle defined by the centers of said axial boreholes.

6. The drill bit direct drive of claim 1, wherein the bearing engaging surface of said bearing segments includes a layer of polycrystalline diamond disposed thereon.

7. A drill bit direct drive for deep well drilling tools, comprising:
   a rotary drill bit;
   a tubular casing;
   a rotary machine positioned within said tubular casing and being adapted to be driven by oil well fluid flowing therethrough;
   a shaft axially mounted within said tubular casing and connected between said rotary machine and said rotary bit whereby rotation of said rotary machine is transferred through said shaft to said rotary bit; and
   a bearing assembly rotatably interconnecting said shaft and said tubular casing whereby said shaft is free to rotate relative to said tubular casing, said bearing assembly comprising,
      a trace ring having a preselected outer diameter, said trace ring being supported on the outer surface of said shaft and extending a preselected radial distance therefrom in a direction generally toward the inner surface of said tubular casing;
      a bearing ring having a plurality of circular boreholes extending axially therein, said bearing ring having an inner diameter less than the trace ring outer diameter and being supported on the inner surface of said tubular casing and extending a preselected
   radial distance from the tubular casing inner surface in a direction generally toward said shaft, said bearing and trace rings being positioned a preselected axial distance apart;
      a plurality of bearing segments being disposed axially intermediate said trace and bearing rings, each of said bearing segments having a trace ring engaging surface, a bearing ring engaging surface, and a holding pin extending from said bearing ring engaging surface into one of said bearing ring axial boreholes, each of said holding pins having a diameter substantially less than the corresponding bearing ring axial borehole diameters whereby the bearing segments are capable of limited tilting relative to said bearing ring, and providing a space between the trace ring and trace ring engaging surface having a gradually reducing axial dimension in the direction of rotation of the shaft and trace ring relative to the tubular casing and bearing ring, the space having fluid flowing therein to provide a hydrodynamic lubricating film between said bearing ring and said bearing ring engagement surface;
      a plurality of disk springs having a bore extending therethrough and being positioned about the holding pin intermediate the bearing ring and the bearing ring engaging surface whereby said bearing segments are urged in a direction generally toward said trace ring;
      said trace ring axial boreholes being arranged in said trace ring with the borehole center points coinciding with a circle generally coaxial with said bearing ring and having a diameter intermediate the trace ring inner and outer diameters; and
      a ring groove extending into the surface of said trace ring adjacent said bearing segments and having an inner diameter corresponding to the borehole center point circle, said ring groove interconnecting said circular axial boreholes.

* * * * *